(12) United States Patent
Nelson et al.

(10) Patent No.: US 6,421,469 B1
(45) Date of Patent: Jul. 16, 2002

(54) IMAGE DATA MANIPULATION FOR IMPROVED IMAGE VISUALIZATION AND ANALYSIS

(75) Inventors: Susan R. Nelson; Susan M. Tuovila; Cheryl M. Smith, all of Panama City, FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/252,246

(22) Filed: Feb. 8, 1999

(51) Int. Cl.[7] .............................. G06T 5/00; G06T 5/50; G06T 7/60; G06K 9/46

(52) U.S. Cl. ...................... 382/274; 382/260; 382/199; 382/132

(58) Field of Search .................................. 382/266, 260, 382/261, 254, 199, 190, 195, 205, 132, 128, 274

(56) References Cited

U.S. PATENT DOCUMENTS 5,631,974 A * 5/1997 Lau-Kee et al. ............ 382/132
6,137,898 A * 10/2000 Broussard et al. .......... 382/132
6,167,167 A * 12/2000 Matsugu et al. ............ 382/199

* cited by examiner

Primary Examiner—Scott Rogers
(74) Attorney, Agent, or Firm—Harvey A. Gilbert; Donald G. Peck

(57) ABSTRACT

Digital image data is manipulated for improved image visualization and analysis. A two-dimensional image includes relevant subject matter and a substantially homogeneous background that at least partially borders on the relevant subject matter. A first sub-image is defined from the two-dimensional image that includes the relevant subject matter and a reduced amount of the substantially homogeneous background. A second sub-image is defined from the first sub-image that substantially defines just the relevant subject matter. A plurality of image processing options are selected from a library of image processing options. The second sub-image is then processed in accordance with the image processing options to generate image output data. The image output data can be displayed for viewing and/or analysis.

23 Claims, 2 Drawing Sheets

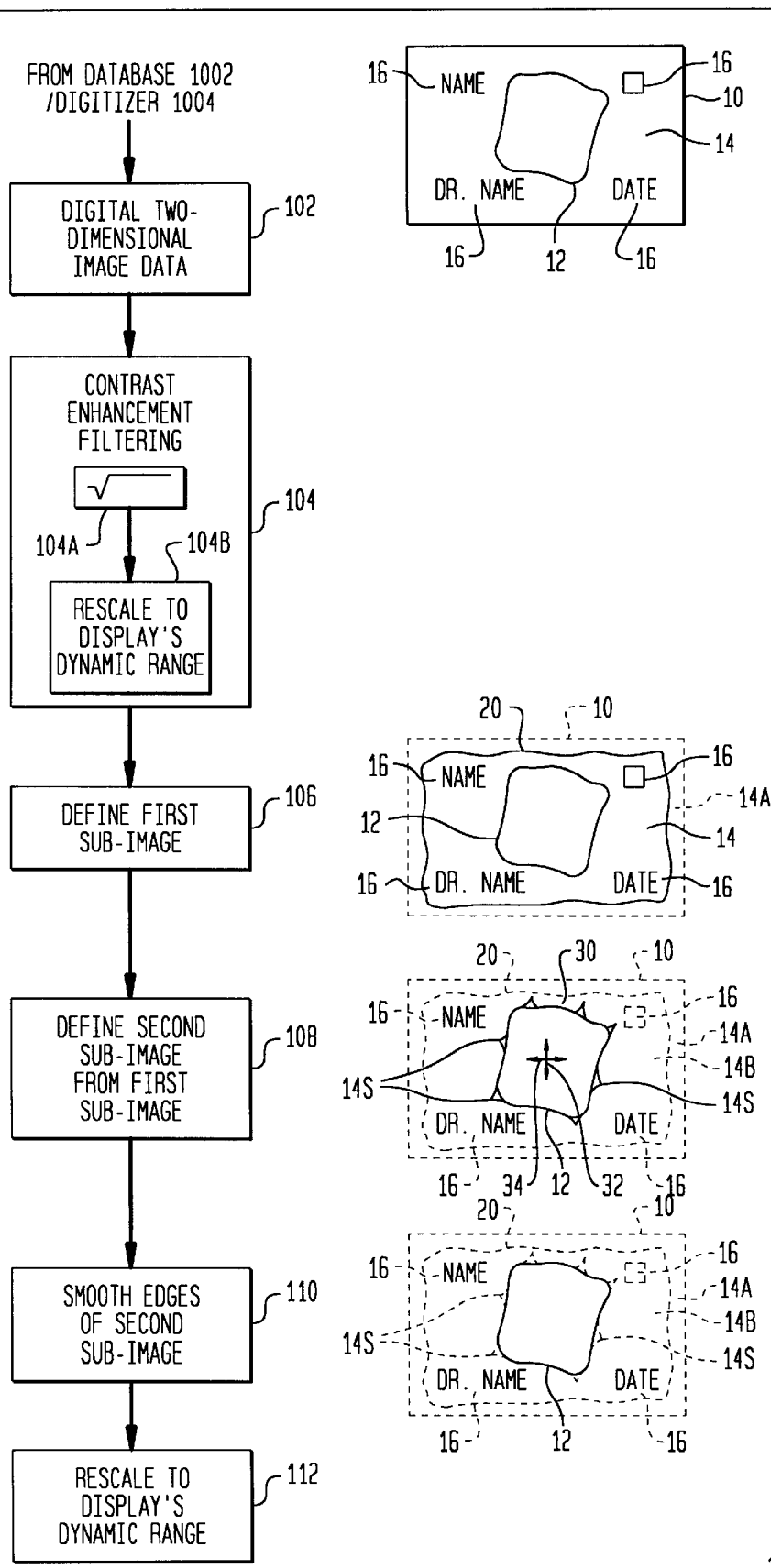

IMAGE DATA MANIPULATION FOR IMPROVED IMAGE VISUALIZATION AND ANALYSIS

ORIGIN OF THE INVENTION

The invention described herein was made in the performance of official duties by employees of the Department of the Navy and may be manufactured, used, licensed by or for the Government for any governmental purpose without payment of any royalties thereon.

CROSS-REFERENCE TO RELATED PATENT APPLICATIONS

This patent application is co-pending with one related patent application entitled "METHOD OF ISOLATING RELEVANT SUBJECT MATTER IN AN IMAGE" (Navy Case No. 78879), and having the same assignee as this patent application.

FIELD OF THE INVENTION

The invention relates generally to image processing and display, and more particularly to an image processing tool that can isolate and then manipulate relevant subject matter of a two-dimensional image for improved image visualization and analysis.

BACKGROUND OF THE INVENTION

While many two-dimensional images can be viewed with the naked eye for simple analysis, many other two-dimensional images must be carefully examined and analyzed. One of the most commonly examined/analyzed two-dimensional images is an x-ray of living beings or inanimate structures. For example, a mammogram is a common film x-ray usually taken with an x-ray machine dedicated to breast imaging. A mammogram usually has low contrast because of the similarity in optical density of breast tissue structures and because only a limited amount of ionizing radiation can be safely received by the patient. The mammogram image also has fairly low resolution due to inherent limits of the x-ray filming process, cost constraints, and the interrelationships of tissue structures in the three-dimensional breast. All of these issues make it difficult to detect breast malignancies, especially in the earliest stages thereof.

Currently, doctors are limited to examining mammogram by visually examining the original x-ray backed by a light source. The only enhancements available are crude ones such as using a magnifying glass, tweaking the contrast on an image viewer, or filtering the image by blocking out a range of pixel intensity levels. Statistics indicate that an estimated twenty percent of malignancies present in mammograms are missed by doctors, usually because they are too small or faint (i.e., low intensity) to be noticed on the initial screening or they were partially obscured by other imaged tissues. Also, the known difficulty of discerning small malignancies forces doctors to take a very conservative approach when reviewing mammograms. Thus, biopsies are often ordered simply because the mammogram is not clear. However, in about eighty percent of patients sent for biopsy, no malignancy is found. As a result, thousands of unnecessary biopsies are performed each year. Each biopsy represents a risk to the patient and can cause the formation of scar tissue in the area of the biopsy which may obscure detection of future problems.

SUMMARY OF THE INVENTION

Accordingly, it is an object of the present invention to provide a method of improving two-dimensional images which must be examined and analyzed.

Another object of the present invention is to provide a method of manipulating image data in order to present same in a form that is most useful to the image examiner at the time of analysis.

Still another object of the present invention is to provide a method of manipulating image data related to a plurality of two-dimensional images so that the examiner can easily compare and contrast the images.

Other objects and advantages of the present invention will become more obvious hereinafter in the specification and drawings.

In accordance with the present invention, image data is manipulated for improved image visualization and analysis. Digital data is provided that represents grey scale values of a two-dimensional image of relevant subject matter and a substantially homogeneous background that at least partially borders on the relevant subject matter. A first sub-image is defined from the two-dimensional image. The first sub-image includes the relevant subject matter and a reduced amount of the substantially homogeneous background. A second sub-image is defined from the first sub-image. The second sub-image substantially defines just the relevant subject matter. A plurality of image processing options are selected from a library of image processing options. The second sub-image is then processed in accordance with the image processing options to generate image output data. The image output data can be displayed for viewing and/or analysis.

BRIEF DESCRIPTION OF THE DRAWINGS

FIG. 2 is a flow diagram of the relevant subject matter isolation method used in the present invention.

DETAILED DESCRIPTION OF THE INVENTION

Figure 1:
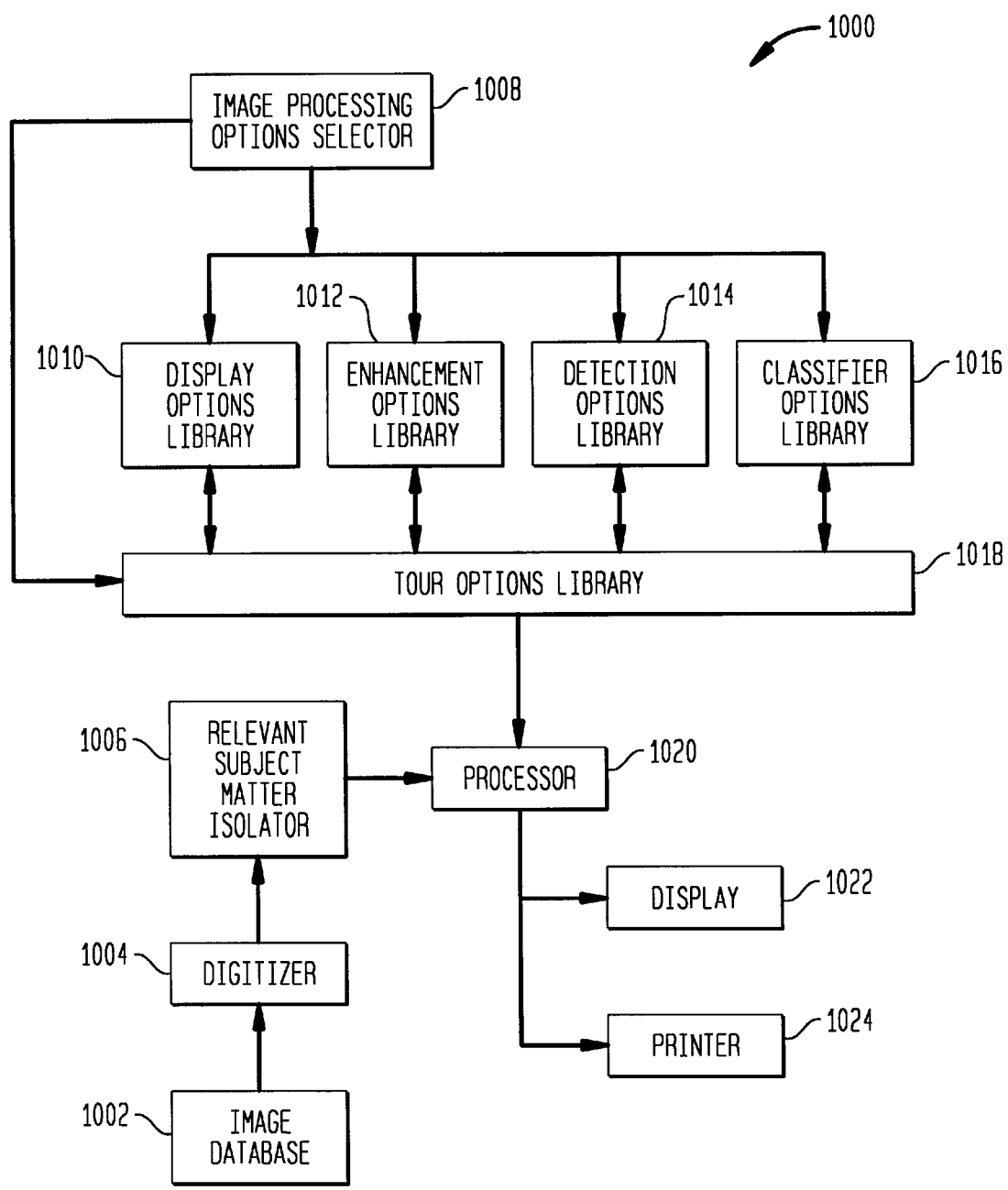
FIG. 1 is a schematic diagram of the system used to carry out image data manipulation in accordance with the present invention.

Referring now to the drawings, and more particularly to FIG. 1, a schematic diagram of the system used to carry out image data manipulation for improved visualization in accordance with the present invention is shown and referenced generally by numeral 1000. By way of illustrative example, system 1000 will be explained as it relates to the manipulation of x-ray image data. However, it is to be understood to be understood that the present invention can be used to manipulate any two-dimensional image data for improved visualization.

For image data manipulation to occur, two-dimensional images must be made available in the form of data. Typically, such data is digital data. Accordingly, an image database 1002 provides data on the two-dimensional images. If the data is not in digital form, a digitizer 1004 converts the image data from database 1002 into a digital representation thereof. As is know in the art, digitizing images means converting an image into a 2-dimensional matrix of picture elements of Apixels@. Each pixel has an intensity value ranging from some lower limit defining pure black to an upper limit defining white. Intermediate pixel intensity values define shades of gray. The most common limits of gray scale levels are 0 to 255, i.e., an 8-bit image.

In most x-rays, the relevant subject matter is surrounded or at least partially bordered by a dark (i.e., black) homogenous background in which bright (i.e., white) labeling or artifacts are present due to imaging anomalies or errors, or to identify the subject matter, provide scaling information, time/date information, etc. However, the dark background and bright labeling or artifacts use the lower and upper regions, respectively, of a display's dynamic range. As a result, image contrast of the relevant subject matter is reduced because the relevant subject matter is not able to utilize the full dynamic range of the display. Reduced contrast of the relevant subject matter means that important details (e.g., tumor presence, bone fractures, fetal anomalies, etc., in the field of medicine; structural defects in the field of static structure analysis; and missed targets or other anomalies in sonar image analysis) could be overlooked or misread. Accordingly, the relevant subject matter is isolated from the homogeneous background and labeling/artifacts at relevant subject matter isolator 1006. The processing carried out by isolator 1006 is the subject of the afore-mentioned co-pending application and will now be explained with the aid of FIG. 2.

In FIG. 2, the image processing steps carried out by isolator 1006 (e.g., a processor) are illustrated on the left and the state of the processed image is illustrated on the right. It is to be understood that the relevant subject matter isolation can be used to isolate relevant subject matter of any two-dimensional image when the relevant subject matter is surrounded or partially bordered by a substantially homogenous background. Typically, the homogenous background is very dark or black (i.e., 0 on a display's grey scale) as is the case with x-ray, mammographic, sonographic or sonar images. While not a requirement, the dark homogenous background frequently supports reversed-out or bright white (e.g., Z on a display grey scale that ranges from 0–Z) labeling or other artifacts. Note that 8-bit images are represented by pixel values 0–255; 10-bit images are represented by pixel values 0–1023; 12-bit images are represented by pixel values 0–4095. However, typical image displays are 8-bit as this is about the limit that the human eye can resolve. As a result, images greater than 8-bit are generally re-scaled for viewing.

The relevant subject matter typically is comprised of grey scale levels falling between the black background and the bright white labeling and artifacts. For example, the relevant subject matter for 8-bit mammogram generally has grey scale values in the range of 50–240 with background regions having grey scale values from 0–50 and labeling/artifacts having grey scale values over 240. To allow for improved analysis of the relevant subject matter, the relevant subject matter is isolated from the homogenous background and the labeling or artifacts. In this way, the amount of data that need be processed is reduced and the relevant subject matter can be stretched or re-scaled to the full dynamic range capability of a display.

A representative two-dimensional image is illustrated generally in FIG. 2 by reference numeral 10. By way of example, it will be assumed that image 10 is an x-ray image that includes a regularly or irregularly shaped area of relevant subject matter 12, a dark background region 14 that is substantially homogeneous in terms of its grey scale level, and bright white labeling or artifacts 16 that appear in background region 14. Background region 14 will appear black and labeling or artifacts 16 will appear white. Note that the boundary between subject matter 12 and background region 14 need not (and typically is not) sharply defined as illustrated, but rather rolls off in terms of grey scale level as is known in the art. That is, the boundary between relevant subject matter 12 and background region 14 transitions to the grey scale level of background region 14 over a number of pixels. The range of grey scale values defining the transition from relevant subject matter 12 to background region 14 must be determined (e.g., using histograms) for the type of data that will be processed. For example, 8-bit mammogram data transitions to background in the range of 3–6% of the maximum grey scale value of 255. In other words, the edge of the relevant subject matter of an 8-bit mammogram image ranges in grey scale value from approximately 8 to approximately 15.

At block 102, image 10 is made available for processing from database 1002/digitizer 1004. Each piece or pixel of resulting digital data represents a grey scale level where a grey scale value of 0 represents black and the maximum grey scale value will represent white. The digital data can be optionally filtered at block 104 to improve contrast of the raw digital data. For example, if image 10 is very dark (e.g., a 12-bit image that ranges in values from 0–3458 with 42% of the pixel values between 0 and 255, 30% of the pixel values between 256–511, and 13% of the pixels between 512–767), it may be beneficial to take the square root of each piece of digital data (i.e., the grey scale value) at block 104A, and then re-scale the data at block 104B to use the full dynamic range of a display (not shown). Note that by taking the square root, no data is lost. Images that are not that dark may only require re-scaling at block 104B. Re-scaling can involve scaling up or down to the display's dynamic range depending on the image data resolution. Further, other types of contrast enhancing filtering could also be used.

At block 106, the digitized and filtered image data is processed to define a first sub-image 20 (shown adjacent to block 106) such that the amount of background region 14 is reduced (i.e., excluded from further processing) by the area 14A between first sub-image 20 and image 10, the outside edge of which being illustrated in dashed-line form. Note that although background region 14 is shown as being reduced on all four sides, this need not be the case and will depend on the specifics of image 10 as will become apparent from the following description.

To define first sub-image 20 at block 106, it is first necessary to provide a threshold grey scale level that, at or below which, will define background region 14 for the human eye's level of perception. For example, for a display having a 256-bit grey scale dynamic range, grey scale values from 0 to approximately 50 are perceived by the human eye as black. In general, approximately the first 20% of a display's dynamic range is perceived by the human eye as black. Thus, in the case of 8-bit mammogram data, the threshold grey scale level could be set to 50 or approximately 20% of the maximum grey scale level.

Starting at the outside edge of image 10, the particular threshold grey scale level is compared with the digital data comprising image 10 in order to define the outer edge boundary of first sub-image 20, i.e., the points at which grey scale values of the image first exceed the threshold grey scale values. This involves scanning the rows and/or columns of image 10 starting at the first and last data points for a row/column and stepping inward toward the central portion of image 10. Note that outside edge boundary portions of first sub-image 20 can be, but need not be, defined at an edge of a label or artifact 16.

In order to better isolate relevant subject matter 12, it is necessary to eliminate more of background region 14 as well as labeling or artifacts 16. To do this, the digital data comprising first sub-image 20 is further processed at block 108 to define a second sub-image 30 which is illustrated adjacent to block 108. Second sub-image 30 is a subset of sub-image 20 that has a further reduced amount of background region 14 surrounding (or just partially bordering as the case may be) relevant subject matter 12. That is, reduced background region 14A is further reduced by the area 14B between first sub-image 20 and second sub-image 30. Note that area 14B also encompasses labeling or artifacts 16.

To accomplish the function of block 108, it is first necessary to define a position (e.g., coordinate, a line defined by several row or column coordinates, etc.) that falls within relevant subject matter 12. This position is illustrated in second sub-image 30 as position 32. While position 32 can be selected in a variety of ways, the center of image 10 is generally a good choice as some portion of relevant subject matter 12 will typically traverse the center of image 10. However, if the relevant subject matter is skewed off-center in the image, various image data points can be tested until a position within the relevant subject matter is defined. With position 32 so defined, it is also necessary to define grey scale value(s) indicative of the outer edge boundary of relevant subject matter 12. As mentioned above, the transition between relevant subject matter 12 and background region 14 need not be a sharp transition and typically rolls off over a plurality of pixels. For example, in 8-bit mammographic images, the roll off occurs over a range of approximately 3–6% of the maximum dynamic range, i.e., the roll off range is approximately equal to grey scale values from 8 to 15.

Starting at position 32, the particular roll off range just described is compared with the digital data comprising first sub-image 20 in order to define the outer edge boundary of second sub-image 30, i.e., the points at which grey scale values of the image first fall within the roll off range. This involves scanning outward from position 32 along rows and/or columns as indicated by arrows 34. As the outer edge of relevant subject matter 12 is encountered, grey scale values quickly drop into the roll off range to define the outer edge boundary of second sub-image 30.

Second sub-image 30 is predominantly just relevant subject matter 12, but can still include a small amount of background region 14. Generally, any of background region 14 associated with second sub-image 30 is in the form of jumps or spikes 14S. Accordingly, if second sub-image 30 has spikes 14S, elimination thereof can be achieved by applying a smoothing routine to second sub-image 30 at block 110. By way of example, a simple smoothing routine that works well examines a grey scale value difference between adjacent points forming the edges of second sub-image 30. If the difference is too large, the last data point falling within tolerance is used.

With background region 14 and labeling or artifacts 16 eliminated from consideration, relevant subject matter 12 can be re-scaled or stretched at block 112 to the full dynamic range of a display that will be used for output. As a result, contrast of relevant subject matter 12 is greatly enhanced to permit improved analysis thereof. Another benefit is that relevant subject matter 12 represents a greatly reduced data set which can be processed faster than the entire image data set comprising image 10. This is important when working with very large image data sets having 12 or 16-bit resolution where any economy in computation saves both time and money.

In order to output relevant subject matter 12 in the best format for a particular application, the present invention uses an image processing options selector 1008 to select one or more image processing routines that will manipulate relevant subject matter 12 for improved image visualization and analysis. The image processing routines can be stored in one or more libraries such as a display options library 1010, an enhancement options library 1012, a detection options library 1014, a classifier options library 1016 and a tour options library 1018. A processor 1020 is used to process the image data associated with relevant subject matter 12 in accordance with the image processing options selected. Image output generated by processor 1020 is typically displayed on one or more output devices such as a display 1022 and/or printer 1024.

In general, image processing options selector 1008 selects various display options, image enhancement options, detection options, classifier options and/or tour options from libraries 1010, 1012, 1014, 1016 and 1018, respectively. Selector 1008 can be implemented in a variety of ways. For example, selector 1008 can be an input device (e.g., keyboard, mouse, manual switches, etc.) used to interactively select the various display, enhancement, detection, classifier or tour options one at a time. In this mode, an image of relevant subject matter 12 on display 1022 could be updated/changed at will by changing one of the earlier-selected options. Selector 1008 could also be used to select a pre-defined script or tour of the options from the various libraries as will be described further below with reference to tour options library 1018. The script or tour could define not only which options processor 1020 will use, but also the order in which the options are implemented by processor 1020. In this mode, an image of relevant subject matter 12 could be displayed once all selected options have been carried out or intermittently at various stages of processing. That is, display 1022 and/or printer 1024 could produce a chronologically-created set of images at various stages of processing.

A "library" as used herein can be defined as a compendium of callable subroutines that contain computer instructions which accomplish a particular task. Usually, libraries contain subroutines having a similar purpose. For example, display options library 1010 defines the various options used to format the image data output generated by processor 1020. Possible display options could include:

allowing the user to decide how many display windows to use on display 1022 so that multiple images can be compared on the same screen;

image magnification or zoom parameters;

allowing the user to decide how many pixels to include in a magnified image;

image appearance in terms of grey scale level, inverse video and colorization (false color);

image morphing (i.e., video-like change in the image so that the image appears to be moving);

labeling used on the display; and image output data archival options, e.g., printing on printer 1024, storage of data, etc. As would be understood by one of ordinary skill in the art, this list of display options is typical but is by no means exhaustive or a limitation of the present invention.

Enhancement options library 1012 defines the various image enhancement options available to the user. The selected enhancement options are used by processor 1020 in manipulating the data associated with relevant subject matter 12. Possible enhancement options could include both well known and specifically designed image enhancement routines. Some possible enhancement routines are:

byte-scaling or contrast enhancement;

background normalization;

binary and grey-scale Sobel filtering;

Laplacian filtering;
weighted median filtering;
Prewitt filtering;
isotropic filtering;
edge enhancement;
contrast-dependent, peak noise removal;
standard deviation enhancement;
variance enhancement; and
fractal enhancement.

Many of these enhancement processes (as well as others) are described in "Practical Image Processing in C," by Craig A. Lindley, John Wiley and Sons, Inc., 1991. As would be understood by one of ordinary skill in the art, the above list of enhancement options is neither exhaustive nor a limitation of the present invention.

Detection options library 1016 defines various image detection options available to the user. That is, the detection options are used to manipulate the data associated with relevant subject matter 12 in order to alert the user/viewer to possible areas of abnormality based on, for example, rapid changes in image intensity. Examples of known image processing techniques for detecting rapid changes in image intensity include:

median filter detection techniques;
standard deviation detection techniques;
statistical feature detection techniques; and
other morphological filtering techniques.

As would be understood by one of ordinary skill in the art, this list of detection options is neither exhaustive nor a limitation of the present invention.

Classifier options library 1018 defines image classification routines available to the user. The selected classification routines are used to manipulate the data associated with relevant subject matter 12 in order to extract greater detail from the previously detected areas of abnormality in order to identify the abnormality. Known classification schemes include those that are rule or neural network based.

Tour options library 1018 is a collection of specified enhancement, display, detection and classifier option subroutine calls. Each tour defines the options needed to accomplish a specific purpose. For example, tours could include:

a whole image tour of various image enhancement and detection options;
a zoomed image tour of various image enhancement and detection options;
a tour specifying certain classification routines;
a tour that uses multiple display windows; and
a morph-in/morph-out tour that displays each change of an image as enhancements are applied thereto. As would be understood by one of ordinary skill in the art, this list of possible tour options is neither exhaustive nor a limitation of the present invention.

Processor 1020 manipulates the data associated with relevant subject matter 12 in accordance with the various options selected. As mentioned above, processor 1020 could be instructed to provide image output data to display 1022 and/or printer 1024 either intermittently or after cumulative processing.

The advantages of the present invention are numerous. Image data is first reduced to its relevant subject matter before undergoing image data manipulation. This allows the image data manipulation to be faster than if the entire image were to be processed. A variety of display, enhancement, detection, classifier and tour options can be selected to process just the relevant subject matter. The image data output can be formatted in a variety of ways to suit the needs of the user. For example, the display could be formatted to show multiple windows with each window showing the same image enhanced in a different fashion. Another option is to use multiple windows with each window depicting a different image so that multiple images can be compared. Still another option is to use multiple windows with each window depicting a different intermittent image processing step so that the user could see which processing steps provide the greatest advantage. In a similar fashion, the image data can be enhanced in one or more ways to best suit an application. Further, the scripted selection could be used to provide a "movie" on display 1022 to depict, for example, how an image of a particular subject matter has changed over a period of time.

Although the invention has been described relative to a specific embodiment thereof, there are numerous variations and modifications that will be readily apparent to those skilled in the art in light of the above teachings. For example, during the relevant subject matter isolation process, the comparisons performed at blocks 106 and 108 can be done on a "pixel-by-pixel" basis for greatest accuracy. However, for more regularly-shaped relevant subject matter, it may be sufficient to skip one or more pixels at each comparison in order to speed up the image processing of the present invention. Various smoothing routines can be applied to the data at block 110. Further, processing can be tailored for specific types of relevant subject matter that always exhibit the same trait, e.g., a straight edge boundary, a specific threshold grey scale value or roll off range, etc. Still further, a variety of other display and/or enhancement options can be added to the respective libraries. It is therefore to be understood that, within the scope of the appended claims, the invention may be practiced other than as specifically described.

What is claimed as new and desired to be secured by Letters Patent of the United States is:

1. A method of manipulating image data for improved image visualization and analysis, comprising the steps of:

providing a library of image processing options;

providing digital data representing grey scale values of a two-dimensional image of relevant subject matter and a substantially homogeneous background that at least partially borders on said relevant subject matter, wherein said grey scale values range from 0 to Z where 0 equals black and Z equals white;

defining a first sub-image from said two-dimensional image by i) providing a threshold grey scale level between 0 and Z, and ii) comparing said threshold grey scale level to said digital data starting at outer edges of said two-dimensional image and moving inward therefrom to define an outer edge boundary of said first sub-image at which said digital data first becomes greater than said threshold grey scale level, said first sub-image including said relevant subject matter and a reduced amount of said substantially homogeneous background;

defining a second sub-image from said first sub-image, said second sub-image substantially defining just said relevant subject matter;

selecting a plurality of said image processing options;

processing said second sub-image in accordance with said plurality of said image processing options to generate image output data; and displaying said image output data.

2. A method according to claim 1 wherein said step of selecting comprises the step of providing for a user's one-by-one selection of each of said plurality of said image processing options from said library.

3. A method according to claim 1 wherein said step of selecting comprises the step of pre-defining a script that orders said plurality of said image processing options wherein said step of processing said second sub-image is carried out in accordance with said script.

4. A method according to claim 1 wherein said image processing options comprise display formats defining how said image output data is displayed and processing algorithms defining how said second sub-image is processed.

5. A method according to claim 1 further comprising the step of filtering said digital data to enhance contrast of said two-dimensional image prior to said step of defining said first sub-image.

6. A method according to claim 5 wherein said step of filtering comprises the step of re-scaling said digital data to a given dynamic range.

7. A method according to claim 5 wherein said step of filtering comprises the steps of:
taking the square root of each of said grey scale values to generate square root digital data; and
re-scaling said square root digital data to a given dynamic range.

8. A method according to claim 1 wherein said two-dimensional image is a mammogram and wherein said threshold grey scale level is approximately equal to 20% of Z.

9. A method according to claim 1 wherein said grey scale values range from 0 to Z where 0 equals black and Z equals white, and wherein said step of defining said second sub-image comprises the steps of:
providing a range of said grey scale values indicative of said substantially homogeneous background;
defining a position in said first sub-image that falls within said relevant subject matter; and
comparing said range to said digital data starting at said position in said first sub-image and moving outward therefrom to define an outer edge boundary of said second sub-image at which said digital data first falls within said range.

10. A method according to claim 9 wherein said two-dimensional image is a mammogram and wherein said range is approximately equal to 3–6% of Z.

11. A method according to claim 1 further comprising the step of re-scaling said second sub-image to a given dynamic range prior to said step of processing.

12. A method according to claim 1 wherein said second sub-image includes said relevant subject matter and a further reduced amount of said substantially homogeneous background that is less than said reduced amount in said first sub-image, said method further comprising the step of applying a smoothing routine to edges of said second sub-image.

13. A method of manipulating image data for improved image visualization and analysis, comprising the steps of:
providing a library of image processing options;
providing digital data representing grey scale values for a plurality of two-dimensional images, each two-dimensional image defined by relevant subject matter and a substantially homogeneous background that at least partially borders on said relevant subject matter, wherein said grey scale values range from 0 to Z where 0 equals black and Z equals white;
providing a threshold grey scale level between 0 and Z;
comparing said threshold grey scale level to said digital data for each two-dimensional image starting at outer edges thereof and moving inward therefrom to define an outer edge boundary of a first sub-image at which said digital data first becomes greater than said threshold grey scale level, said first sub-image including said relevant subject matter and a reduced amount of said substantially homogeneous background;
providing a range of said grey scale values indicative of said substantially homogeneous background;
defining a position in said first sub-image that falls within said relevant subject matter;
comparing said range to said digital data starting at said position in said first sub-image and moving outward therefrom to define an outer edge boundary of a second sub-image at which said digital data first falls within said range, said second sub-image substantially defining just said relevant subject matter;
selecting a plurality of said image processing options;
processing said second sub-image defined from each two-dimensional image in accordance with said plurality of said image processing options to generate image output data; and
displaying said image output data.

14. A method according to claim 13 wherein said step of selecting comprises the step of providing for a user's one-by-one selection of each of said plurality of said image processing options from said library.

15. A method according to claim 13 wherein said step of selecting comprises the step of pre-defining a script that orders said plurality of said image processing options wherein said step of processing said second sub-image is carried out in accordance with said script.

16. A method according to claim 13 wherein said image processing options comprise display formats defining how said image output data is displayed and processing algorithms defining how said second sub-image is processed.

17. A method according to claim 13 further comprising the step of filtering said digital data to enhance contrast of each two-dimensional image prior to said step of comparing said threshold grey scale level to said digital data.

18. A method according to claim 17 wherein said step of filtering comprises the step of re-scaling said digital data for each two-dimensional image to a given dynamic range.

19. A method according to claim 17 wherein said step of filtering comprises the steps of:
taking the square root of each of said grey scale values to generate square root digital data; and
re-scaling said square root digital data for each two-dimensional image to a given dynamic range.

20. A method according to claim 13 wherein said two-dimensional image is a mammogram and wherein said threshold grey scale level is approximately equal to 20% of Z.

21. A method according to claim 13 wherein said two-dimensional image is a mammogram and wherein said range is approximately equal to 3–6% of Z.

22. A method according to claim 13 further comprising the step of re-scaling each said second sub-image to a given dynamic range.

23. A method according to claim 13 wherein said second sub-image includes said relevant subject matter and a further reduced amount of said substantially homogeneous background that is less than said reduced amount in said first sub-image, said method further comprising the step of applying a smoothing routine to edges of said second sub-image.

* * * * *